US010682679B2

(12) United States Patent
Rockwell et al.

(10) Patent No.: US 10,682,679 B2
(45) Date of Patent: Jun. 16, 2020

(54) REMEDIATION OF CONTAMINATED PARTICULATE MATERIALS

(71) Applicant: ExxonMobil Research and Engineering Company, Annandale, NJ (US)

(72) Inventors: Gregory Paul Rockwell, Sarnia (CA); Randall Stephen Lachine, Brights Grove (CA); Babak Adam Jajuee, Calgary (CA); Bradley Scott Barnes, Sarnia (CA); Rainer Detlef Mai, Sarnia (CA)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 16/002,469

(22) Filed: Jun. 7, 2018

(65) Prior Publication Data
US 2018/0290190 A1    Oct. 11, 2018

Related U.S. Application Data

(62) Division of application No. 14/098,028, filed on Dec. 5, 2013, now Pat. No. 10,016,795.
(Continued)

(51) Int. Cl.
B09C 1/00       (2006.01)
B09C 1/06       (2006.01)
F23G 7/14       (2006.01)

(52) U.S. Cl.
CPC ............... B09C 1/06 (2013.01); F23G 7/14 (2013.01); B09C 2101/00 (2013.01); F23G 2201/701 (2013.01)

(58) Field of Classification Search
CPC ........ B09B 1/06; F23G 2201/701; F23G 7/14
See application file for complete search history.

(56) References Cited

U.S. PATENT DOCUMENTS 3,681,851 A    8/1972 Fleming
4,402,274 A    9/1983 Meenan
(Continued)

FOREIGN PATENT DOCUMENTS

CA    2632710 A1    6/2007
DE    3728487 A1    3/1983
(Continued)

OTHER PUBLICATIONS

International Search Report and Written Opinion PCT/US2013/074352 dated Dec. 11, 2013.
(Continued)

*Primary Examiner* — Janine M Kreck
(74) *Attorney, Agent, or Firm* — Liza Negron; Glenn T. Barrett

(57) ABSTRACT

A process for the remediation of contaminated particulate materials by the addition of an environmentally benign, carbonaceous fuel source in low concentration to enable or enhance smoldering combustion. The process may be applied to both in situ and ex situ treatments. In an ex situ smoldering process for the remediation of contaminated particulate materials in a continuous manner, contaminated feed is introduced near the top of a treatment unit and treated product emerges near the bottom. A smoldering front is maintained in the unit, fed by the fuel in the contaminated particulate material and a supply of combustion-supporting gas, such as air.

16 Claims, 5 Drawing Sheets

Related U.S. Application Data

(60) Provisional application No. 61/736,759, filed on Dec. 13, 2012.

(56) References Cited

U.S. PATENT DOCUMENTS

| | | | |
|---|---|---|---|
| 4,615,712 A | 10/1986 | Wen | |
| 4,782,625 A | 11/1988 | Gerken | |
| 4,844,807 A | 7/1989 | Manchak, Jr. | |
| 4,913,586 A | 4/1990 | Gabbita | |
| 4,927,293 A | 5/1990 | Campbell | |
| 4,934,931 A | 6/1990 | Angelo, II | |
| 5,169,263 A | 12/1992 | Johnson | |
| 5,193,934 A | 3/1993 | Johnson | |
| 5,236,282 A | 8/1993 | Teasel | |
| 5,259,962 A | 11/1993 | Later | |
| 5,458,747 A | 10/1995 | Marks et al. | |
| 5,671,762 A | 9/1997 | Hancock, Jr. | |
| 5,678,494 A | 10/1997 | Ulrich | |
| 5,813,799 A | 9/1998 | Calcote | |
| 5,967,230 A | 10/1999 | Cooper et al. | |
| 6,171,030 B1 | 1/2001 | Miyake et al. | |
| 6,391,627 B1 | 5/2002 | Parry | |
| 7,674,946 B2 | 3/2010 | Cerea | |
| 10,016,795 B2* | 7/2018 | Rockwell | B09C 1/06 |
| 2002/0129808 A1 | 9/2002 | Manner | |
| 2005/0109710 A1 | 5/2005 | Mitari | |
| 2009/0180836 A1 | 7/2009 | Gerhard et al. | |
| 2011/0061577 A1 | 3/2011 | Lo | |
| 2012/0073932 A1 | 3/2012 | Burnett et al. | |
| 2012/0272878 A1 | 11/2012 | Grant et al. | |
| 2012/0288332 A1* | 11/2012 | Thomas | F23C 99/006 405/128.6 |

FOREIGN PATENT DOCUMENTS

| | | |
|---|---|---|
| DE | 4200890 A1 | 7/1993 |
| DE | 4210926 A1 | 10/1993 |
| DE | 19632451 C1 | 4/1998 |
| EP | 405067 A2 | 1/1991 |
| EP | 1184518 A1 | 3/2002 |
| JP | 2004167390 A | 6/2004 |
| WO | 95027572 A1 | 10/1995 |
| WO | 9530453 A1 | 11/1995 |
| WO | 9534349 A1 | 12/1995 |
| WO | 2012154402 A1 | 11/2012 |
| WO | 2014074295 A1 | 5/2014 |

OTHER PUBLICATIONS

Pironi et al., "Self-Sustaining Smoldering Combustion for NAPL Remediation: Laboratory Evaluation of Process Sensitivity to Key Parameter", Environmental Science & Technology, 2011, pp. 2980-2986, vol. 45, ACS Publications, American Chemical Society.

Pironi et al., "Small-scale forward smouldering experiments for remediation of coal tar in inert media", Proceedings of the Combustion Institute, 2009, pp. 1957-1964, vol. 32, Elsevier, ScienceDirect.

Switzer et al., "Self-Sustaioning Smoldering Combustion: A Novel Remediation Process for Non-Aqueous-Phase Liquids in Porous Media", Ennvironmental Science & Technology, 2009, pp. 5871-5877, vol. 43, ACS Publications, American Chemical Society.

Moore et al., "In situ combustion in Canadian heavy oil reservoirs", Fuel, 1995, pp. 1169-1175, vol. 74, No. 8, Elsevier Science Ltd., Butterworth Heinemann.

"Humalite, Alberta'S Form of Leonardite", Retread Resources Ltd.,2009. http://retreadresources.com/ResourceJumalite.html.

"Superfund Soil Contamination", United States Environmental Protection Agency, http://www.epa.gov/superfund/students/wastsite/soilspil.htm.

MacPhee et al., "A novel method for simulating smoldering propagation and its application to STAR (Self-sustaining Treatment for Active Remediation)", Environmental Modelling and Software, May 2012, pp. 84-98, vol. 31, Elsevier, ScienceDirect.

Grant, "Self-Sustaining Treatment for Active Remediation", Pollution Engineering, Aug. 2010, pp. 23-28, vol. 32.

Rein, "Smouldering Combustion Phenomena in Science and Technology", International Review of Chemical Engineering, 2009, pp. 3-18, vol. 1.

Zihms et al., "Understanding the impact of high temperature processes on soil properties", EGU General Assembly 2012 held Apr. 22-27 , 2012 in Vienna, Austria, p. 875, Geophysical Research Abstracts.

Pironi et al., "Column Experiments of Smouldering combustion as a Remediation Technology for NAPL Source Zones" , American Geophysical Union, Fall Meeting 2008, Abstract #H34C-03.

Switzer et al., "Smouldering Technology for Aquifer Remediation (STAR): A Novel Remediation Technique for Pooled and Residual NAPL", Sixth International Conference on Remediation of Chlorinated and Recalcitrant compounds, May 19-22, 2008, Monterey, California, USA.

Grant et al., "Self-Sustaing Treatment for Active Remediation (STAR): Overview of Scientific Principles and INintial Field Applications for the Treatment of Coal Tar in Soils", SiREM, 130 Research Lane, Suite 2, Ontario, Canada.

Gerhard, "Self-Sustaining Smouldering Combustion for the Remediation of Organic Industrial Liquids in Soil", University of Western Ontario, London, Ontario, Canada Apr. 19, 2011.

Lei Y. and Liang D., "Experimental Study of Upward Forward Smoldering Combustion", Engineering Procedia, 2011, pp. 196-204, vol. 11, Elsevier, ScienceDirect.

\* cited by examiner

REMEDIATION OF CONTAMINATED PARTICULATE MATERIALS

CROSS REFERENCE TO RELATED APPLICATIONS

This application is a divisional application of U.S. patent application Ser. No. 14/098,028, filed on Dec. 5, 2013, which related and claims priority to U.S. Provisional Patent Application No. 61/736,759 filed on Dec. 13, 2012.

FIELD OF THE INVENTION

The presently disclosed subject matter relates to the remediation of particulate materials contaminated with organic compounds. In particular, the presently disclosed subject matter relates to a process for the application of smoldering combustion to remediate contaminated particulate materials.

BACKGROUND OF THE INVENTION

Contamination of particulate materials (e.g., soils, sediments, sludges, or muds) can arise from hazardous materials being spilled, leaked, discharged, co-processed, or buried at a site, or from intrusion of contaminants from offsite sources. As an example, leaking underground storage tanks have contaminated the soil at sites with petroleum hydrocarbons and lead, and caused similar contamination of adjacent sites through migration in the subsurface. In general, contaminants which may be found in particulate materials include liquids, which may have associated vapors, and solids. Contaminants may be physically or chemically attached to particles, or may be present as a separate phase between particles, such as non-aqueous phase liquids (NAPLs). Liquid contaminants include petroleum hydrocarbons, coal tars, and industrial solvents, while solid contaminants include salts, metals, and organic materials (e.g., explosives, pesticides).

Remediation of contaminated particulate materials implies the removal of contaminants and their impacts for the general protection of health and for the benefit of the environment. For example, remediation at former industrial ("brownfield") sites may be a prerequisite for redevelopment for residential, commercial, or new industrial use. Remediation is generally subject to an array of regulatory requirements, and also can be based on assessments of human health and ecological risks in light of planned future use.

Site remediation methods addressing contamination can be classified in general terms as: (1) ex situ methods in which the particulate material is displaced and treated or disposed of in a waste facility; and (2) in situ methods in which the particulate material remains in place for treatment. Stabilization, solidification, or containment, while not remediation methods in themselves, may also be used to prevent the contamination from becoming more widespread. Treatment methods for organic contaminants are numerous and varied, with examples including: thermal approaches like incineration and thermal desorption; washing/flushing with aqueous solutions or organic solvents; bioremediation, in which microbial activity is stimulated to achieve enhanced biodegradation; and chemical oxidation, typically with an aqueous solution or gas. Combinations of methods are also common, such as washing with thermal treatment of separated, highly contaminated fine particles.

Of the thermal remediation methods for particulate materials, incineration is generally the most effective for destroying organic contaminants due to the high temperatures achieved. However, high temperatures also have greater associated fuel costs and tend to degrade native properties of soils and sediments. Due to the range of wastes fed into incinerators, their emissions must also be carefully monitored and controlled (e.g., through temperature and filtration). Thermal desorption, in which organic contaminants are desorbed from particulate materials and combusted in a burner, is a leading alternative to incineration. Thermal desorption is a cooler, less harsh treatment than incineration, but may be ineffective for particulate materials with high moisture contents or contaminant levels. While not as fuel-intensive as incineration, thermal desorption also has substantial fuel costs associated with both the desorbing and combusting of contaminants.

Remediation technologies are frequently benchmarked by cost to offsite disposal at a waste facility, which relocates contaminated particulate materials to an engineered site for long-term storage. Offsite disposal is often the most economical option for these materials and has a relatively low risk of failure in reaching regulatory criteria at a site. Except when transportation is impractical due to distance or quantity of material, few technologies can routinely compete with its combination of reliability and cost effectiveness. One of the most commonly employed alternatives to offsite disposal for organic contamination is bioremediation, which can cost roughly half the price. While bioremediation provides significant savings over offsite disposal, its application is generally restricted to particulate materials with relatively low levels of contamination, especially in the more refractory hydrocarbons. There is therefore a need for a cost-effective remediation technology that is effective when bioremediation cannot be applied.

Smoldering, which is a flameless combustion process, is a promising new approach for remediating particulate materials containing organic contamination. Smoldering may be sustained in a particulate material provided sufficient fuel is present. This process occurs naturally, for example, in underground peat fires. However, organic contaminants can also provide sufficient energy for self-sustaining smoldering combustion under the right conditions. Generally, these conditions include high enough contaminant concentrations, a supply of air, adequate retention of heat, and an initial source of heat to ignite the smoldering front. If these conditions are met, smoldering can be used as a process to remediate particulate materials, virtually eliminating all organic contaminants.

Smoldering combustion can be initiated in an in situ approach by actively heating a small region of contaminated particulate material below the surface and introducing air once that region has reached ignition temperature (typically 200-400° C.). The heater may then be deactivated, while the air supply is maintained to sustain a smoldering front, which propagates through the bed of particulate material destroying contaminants. Provided there is sufficient fuel for the process in the particulate material, smoldering can be self-sustaining in the sense that no further active heating is required after ignition, as the contaminants themselves supply the heat required for their ongoing destruction.

Smoldering has the potential to provide thorough contaminant removal in a cost-effective process. Unlike bioremediation, smoldering is capable of remediating particulate materials with high levels of organic contaminants, including the more refractory contaminants associated with events like crude oil spills. It is, moreover, facilitated by higher contaminant concentrations and is therefore naturally suited to heavily contaminated particulate materials. In addition, the cost of smoldering on a proportionate weight basis may be similar to bioremediation as a result of the savings on fuel costs, which are significant costs for other thermal remediation technologies (e.g., incineration and thermal desorption). However, like other forms of thermal remediation, smoldering thoroughly removes combustible contaminants, enabling stringent remediation standards to be met. Smoldering therefore offers the possibility of a thorough, robust, and cost-effective technology for remediating particulate materials contaminated with organic compounds.

Smoldering has been previously considered as a beneficial adjunct to thermal desorption. For example, it was recognized that hot gases used to desorb hydrocarbons could also combust molecules in the soil, as described in U.S. Pat. No. 5,193,934. In addition, the use of porous burners has been described in WO 95/3045 and WO 95/34349 to destroy desorbed hydrocarbons in a smoldering process with the heat of combustion recycled to assist in subsequent desorption. The use of smoldering as a primary strategy for soil remediation has been described by Gerhard et al. in *Proc. Combust. Inst.* 32, 1957 (2009), *Environ Sci. Technol.* 43, 5871 (2009), and *Environ Sci. Technol.* 45, 2980 (2011), as well as in situ methods described in CA 2 632 710 and US 2009/0180836, which have been the focus of reported field work to date. In certain respects, namely the use of subterranean combustion, in situ smoldering resembles the enhanced oil recovery method known as in situ combustion or fireflooding, described, for example, by Moore et al. in *Fuel* 74, 1169 (1995).

More recently, US Patent Application Publication No. 2012/0272878 to Grant et al. describes the application of smoldering for the volumetric reduction of organic liquids. US Patent Application Publication No. 2012/0288332 to Thomas et al. describes a method for remediating porous materials by fuel-assisted smoldering. While both disclose methods for enhancing smoldering with supplemental fuel sources, the focus is on fuel sources such as oily waste and petroleum hydrocarbons that are unlikely to confer environmental benefits to the smoldered products (e.g., treated soils and sludges), and which may, in some instances, be deleterious if complete destruction of the supplemental fuel source is not achieved or if more hazardous emissions are produced.

SUMMARY OF THE INVENTION

In order for smoldering to be self-sustaining, and therefore more cost-effective, adequate fuel must be present in the contaminated particulate material. This fuel can be the target organic contaminants or natural organic matter such as lignite or peat. Particulate materials with insufficient levels of these fuels may nonetheless have high enough organic contaminant concentrations to be considered contaminated according to regulatory standards. If the particulate material does not contain sufficient fuel to permit self-sustaining smoldering combustion, an additive in the form of an environmentally acceptable fuel source can be introduced to increase its fuel content and promote smoldering. This may be done regardless of whether smoldering is carried out in situ without displacement of the contaminated particulate material or ex situ in engineered mounds or pits or a reactor. In addition, the use of such additives may be beneficial for the remediation of any particulate material through smoldering by increasing treatment temperatures for more complete contaminant oxidation; providing a baseline amount of fuel to mitigate fluctuations due to heterogeneity in the particulate material; or improving the quality and beneficial reuse of smoldered product. The additives described herein are environmentally benign substances rich in organic carbon; they are added in quantities sufficient to enable effective self-sustaining smoldering. Examples of suitable additives include peat and humalite.

According to the present invention, the additive for promoting smoldering is selected to have a total organic carbon concentration (weight of non-carbonate carbon in a sample divided by dry sample weight) typically of at least 25 weight percent, preferably above 35 weight percent and, in order to enable effective self-sustaining smoldering, it is added to the particulate material in an average concentration in the particulate material, following introduction, of up to 10 weight percent, typically 1 to 5 weight percent, depending on the amount of available smoldering supporting material present in the particulate material prior to the addition. The additive may be distributed heterogeneously within a treatment bed for an in situ application, in which case the average concentration is based on the entire bed to be treated.

When the addition of the additive is used for in situ remediation, it will normally be a liquid such as biodiesel or bioethanol in order to facilitate injection through one or more injection wells located in the contaminated region. Smoldering may then be initiated at a location proximate the location at which the liquid fuel is injected and a supply of combustion-supporting gas, normally air, is maintained to sustain the smoldering front as it progresses through the treatment bed. The front may assist in distributing the liquid additive through the bed, in a manner akin to the transport of oils seen in fireflooding. Solid smoldering-promoting additives may be added to the treatment bed by insertion through boreholes, trenches, or excavations, after which smoldering may be ignited and sustained by the injection of air through injection wells.

In addition, we have developed a process as well as a process unit for ex situ smoldering which can be used for the remediation of contaminated particulate materials either with or without a smoldering-promoting additive, depending on the smoldering characteristics of the soil. The ex situ remediation process conducted in this unit is distinguished by being of a continuous mass-flow design. While the ex situ approach has the added expenses associated with bulk displacement (e.g., soil excavation or sediment dredging) the advantages in process control are significant. They include preprocessing of particulate materials (e.g., shredding, intermixing, drying, dewatering, or adding fuel/diluent), enhanced air distribution for more uniform treatment throughout the bed, confinement of smoldering to the vessel (i.e., lower risk of spreading to the surroundings—a particular hazard in forested areas or with surrounding peat bogs), and easier handling of emissions. In addition, the continuous mass-flow design improves efficiency over a batch system by eliminating downtime (increasing throughput) while maintaining a stable smoldering process.

According to the present invention, the ex situ process for the remediation of contaminated particulate materials comprises: (i) removing the contaminated particulate material from its location in the ground, (ii) transferring the contaminated particulate material removed from the ground and admitting it into a remediation unit comprising a vertically extensive smoldering combustion vessel having an inlet at the top for contaminated feed and an outlet at the bottom for remediated product to be withdrawn from the vessel, (iii) heating a region of loaded feed in the vessel, (iv) admitting combustion-supporting gas into the loaded feed to ignite a smoldering combustion front and enable it to progress through the loaded feed in the vessel, and (v) withdrawing remediated, smoldered product from the bottom of the vessel and admitting additional contaminated feed at the top of the vessel to maintain the smoldering front at a vertical location in the vessel between the top and the bottom of the vessel.

The process unit for the remediation of particulate materials comprises, briefly, a vertically extensive smoldering combustion vessel having an inlet at the top for contaminated feed to be remediated by smoldering, an outlet at the bottom for treated, smoldered product to be withdrawn from the vessel, means for heating a region of loaded feed within the vessel, and means for injecting combustion-supporting gas into the loaded feed to ignite and sustain smoldering combustion. The vessel will generally have an upper section in which smoldering takes place and a lower section which channels the smoldered product towards the outlet. In one embodiment, the lower section will be a mass-flow funnel, as is known in the field of bulk solids handling, emptied by an auger or screw conveyor at its bottom, which transfers smoldered product to the outlet. This product withdrawal mechanism is capable of providing mass flow, in which the treatment bed in the upper section is emptied uniformly, as opposed to funnel flow, where emptying of the upper section occurs disproportionately in the center. By achieving mass flow during product withdrawal, the risk of disturbing or even extinguishing the active smoldering front is minimized. Further preferred features of the unit are described in more detail below.

DRAWINGS

DETAILED DESCRIPTION

Smoldering Unit

Figure 1:
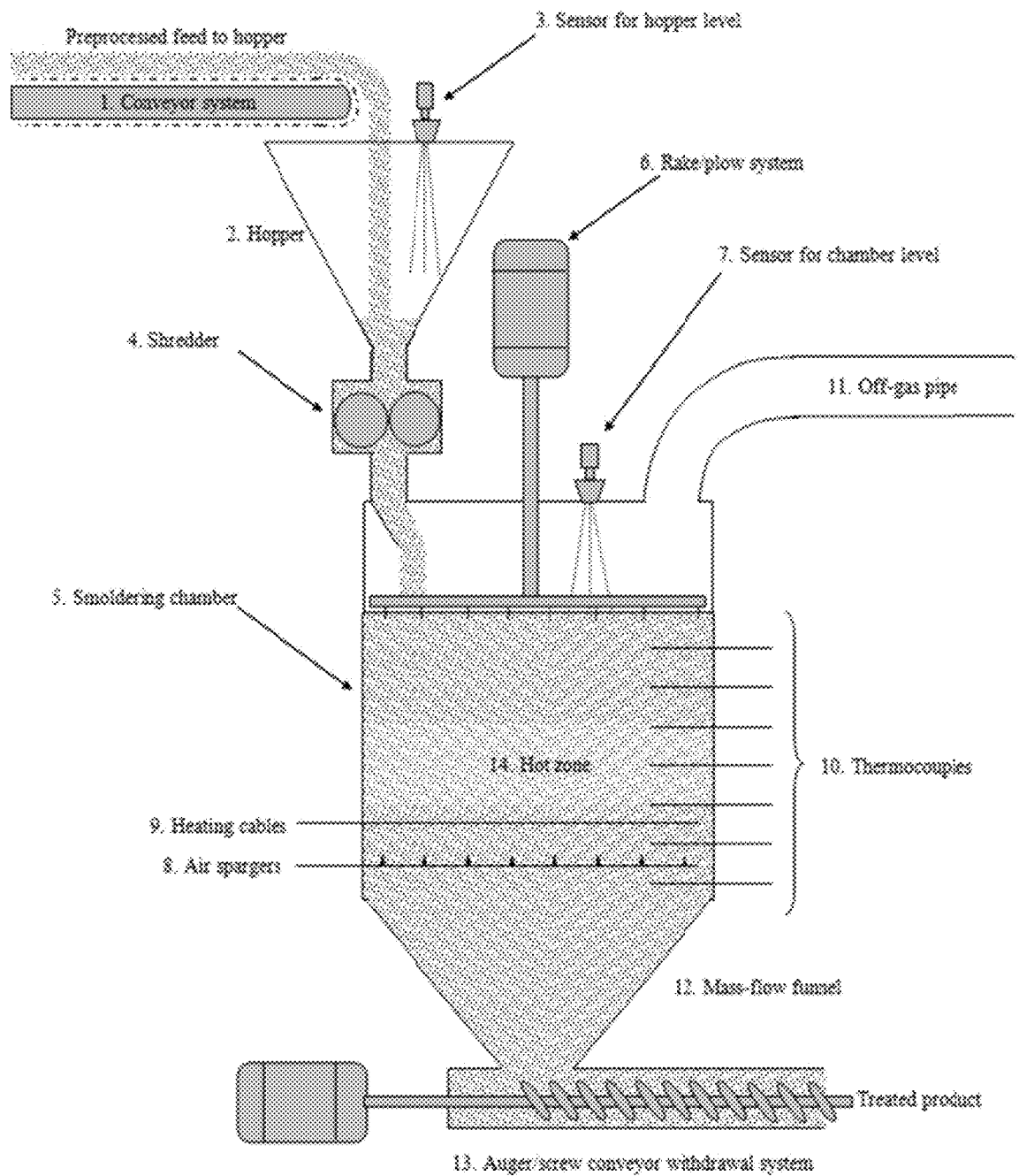
FIG. 1 is a schematic illustration of a continuous smoldering system for ex situ remediation of contaminated particulate materials.

The functioning of the smoldering-promoting additive may be better understood from a description of the ex situ smoldering process unit and the process which is carried out in it. A schematic diagram of the continuous smoldering system for ex situ remediation of contaminated particulate materials is shown in FIG. 1. During operation of the system, a conveyor 1, which could be based on a belt or auger, delivers pretreated feed to a hopper 2. The pretreatment may consist of shredding, drying (possibly with heat recycled from the smoldering unit), dewatering (e.g., treating dredged sediments with a plate-and-frame filter press), removing large rocks or debris, homogenizing, mixing different feeds together, or mixing in a substance to enhance smoldering performance, e.g., a smoldering-promoting additive or a less combustible diluent. The level in the hopper is monitored by a sensor 3, which actuates the conveyor system when the feed in the hopper is below a preset level. Feed exiting the hopper passes through a shredder 4 to improve packing and air distribution before entering the open top of the smoldering vessel 5, which is configured for bottom-to-top front propagation. Inside the chamber, loaded feed is evenly distributed by a rake or plow system 6, and the loaded feed level is controlled using another sensor 7, which actuates the shredder.

The smoldering chamber has ports on the sides for air spargers 8, heating cables 9, and thermocouples 10. The air spargers are perforated pipes (perforated on the top side) located in a plane, typically near the bottom of the chamber. To prevent clogging, the perforations are capped with conical deflectors (not shown). The heating cables lie in a plane somewhat above the air spargers, and may be retractable since they are only required for ignition. The thermocouples are vertically distributed throughout the treatment bed to monitor temperatures during both the initial heating stage and continuous smoldering process so as to monitor the position and progress of the smoldering front; the thermocouples may also be distributed radially to determine the temperatures across the bed. If bulk solid flow through the system disturbs the thermocouples, an alternative arrangement would be in a bundle along the vertical axis of the reactor, passing through the shaft of the rake or plow system.

The smoldering chamber 5 has two more external connections. At the top of the chamber, a pipe 11 is attached for collecting the off-gas for treatment to remove noxious gases and any solid particulates to comply with air emission standards. The pipe is desirably under negative pressure to draw the gas in. The gases may subsequently pass through a water knockout tank and volatile organic compound (VOC) removal system (e.g., a carbon adsorption bed or burner). The second connection is located at the bottom, where the chamber tapers as a mass-flow funnel 12, which terminates over a channel or pipe housing an auger or screw conveyor 13 for removing smoldered product. The combination of a mass-flow funnel with an auger or screw conveyor is an established system in the bulk solids handling industry for achieving even withdrawal (mass flow) over the cross section of a vessel, which will cause less disruption to the active smoldering front. The ability to vary the rotational speed of the auger provides a high degree of control over the rate of product withdrawal. The auger is actuated based on input from the thermocouples, as described below. Alternative configurations for achieving mass flow from the chamber include having multiple augers in the channel at the base of the funnel or eliminating the funnel and having what is known in the bulk solids handling industry as a "live bottom" at the base of the chamber, in which an array of augers in a horizontal plane is used to achieve mass flow, maintaining a stable and even smoldering front in the upper region of the vessel.

Operation of Smoldering Unit

During operation, the smoldering chamber 5 is first filled with a contaminated particulate material to be treated, the particulate material optionally mixed with one or more of the following: a smoldering-promoting additive; a complementary particulate material that modifies aggregate fuel concentration, thereby altering the temperature or rate of smoldering, or aggregate texture for improved combustion-supporting gas flow or distribution. Examples of complementary particulate materials include other contaminated particulate materials in need of treatment and less combustible diluents, such as sand or previously smoldered product. Admixing with the primary contaminated particulate material may be accomplished by means of an additional feeder, which may be integrated with the conveyor or a separate component of the feed system. The additional feeder may be, for example, a drip line, injector, or sprayer for liquid additives or a screw feeder, shaker (above the conveyor) or separate conveyor for solids, such as solid additives and complementary particulate materials. The heaters are then activated to raise the temperature of nearby loaded feed to 200-400° C. for ignition. Air is subsequently introduced through the spargers, possibly blended with nitrogen to moderate the onset of smoldering combustion. Once the smoldering process is established (i.e., rapid temperature rise near the heaters is detected), the heaters may be deactivated and retracted from the chamber to facilitate bulk solid flow. At this point, only a supply of air is needed to sustain the smoldering front, which propagates upward through the treatment bed.

Without further intervention, the smoldering front would terminate when it reached the top of the treatment bed or when the air supply was turned off. Only the loaded feed within the chamber would then be remediated and the process would have to be repeated for successive batches. To eliminate the downtime associated with successive batches, the system runs in one of two continuous modes. In fully continuous mode, the speed of the smoldering front is matched by the rates of the feed supply system (feed conveyor 1 and shredder 4) and the withdrawal auger 13 so that the front remains in the same substantially fixed vertical position in the vessel. The speed of the front is determined from temperature data at different heights, and feed is continuously provided from the top of the chamber while being continuously withdrawn from the bottom. In semi-continuous or intermittent mode, the auger system keeps the smoldering front in a certain vertical region or "hot zone" 14 marked by a lower vertical location and an upper vertical location. When the front reaches the upper thermocouple of this region, the auger is activated until enough product has been withdrawn to align the front with the lower thermocouple. This process is then repeated as necessary while the overall quantity in the chamber is kept at the pre-set level by the feed supply system. Depending on the speed of propagation of the smoldering front, either one of these continuous modes could be more convenient.

As demonstrated in the Examples, relatively high temperatures may be achieved in the process, typically in excess of 600° C. at the advancing smoldering front; these temperatures will destroy most organic contaminants, though inorganic contaminants (e.g., metals), if present, would typically not be removed by this process (exceptions may include relatively low-boiling metals, such as mercury). However, for many contaminated particulate materials, removal of organic contaminants is sufficient to achieve remediation.

Smoldering-Promoting Additives

Environmentally benign additives which promote smoldering combustion may be added to contaminated particulate materials to facilitate the remediation process. A smoldering-promoting additive can be effective to enable a particulate material that is unable or only intermittently able to sustain smoldering combustion to consistently sustain smoldering combustion; to enable smoldering combustion to take place at a higher temperature, more favorable to contaminant destruction; or to improve the quality and beneficial reuse of smoldered product. The additive may be used in ex situ processes, for instance, as described above, or in combination with an in situ process in which the additive may be injected or otherwise incorporated within the contaminated particulate material in place.

Both liquid and solid smoldering-promoting additives may be used; liquid additives are particularly well suited for in situ application since the liquid may be injected into the ground through injection wells at suitably spaced intervals. Smoldering-promoting additives have the capability both to extend the application of smoldering technology and to improve process performance without the risks associated with mixing in contaminants (e.g., oily waste or petroleum hydrocarbons) as fuel sources, which include failure to achieve complete removal and more hazardous emissions. The benefits of smoldering-promoting additives will derive from: permitting contaminated particulate materials to be treated using smoldering combustion that would otherwise have insufficient fuel for a self-sustaining process; enabling higher smoldering temperatures to be achieved, which provide greater contaminant oxidation and simpler emissions handling as a result of lower levels of unoxidized or partially oxidized contaminants in the off-gas; and compensating for heterogeneity in the distribution of fuel in contaminated particulate materials by providing a base amount of fuel to sustain a steady, uninterrupted smoldering process. In addition, the quality and beneficial reuse of the smoldered product may be enhanced in at least one of the following respects: improved texture, e.g., permeability; improved ability to absorb or retain water and other nutrients; increased residual natural organic matter.

The additives are typically used at a concentration of less than 10 weight percent of the particulate material but higher amounts may be used if necessary, although the economics of the process may be adversely affected. Lower amounts may be appropriate, e.g., 1 to 5 weight percent, when the contaminants or natural organic matter present in the particulate material provide substantial fuel for the process. In general, the smoldering-promoting additives may be characterized as environmentally benign, carbon-rich substances with total organic carbon concentrations of at least 25 weight percent, typically of at least 35 weight percent. Solid additives could be, for example, peat, humalite or biochar. The solid smoldering-promoting additives may be ground or otherwise broken down prior to admixing with the contaminated particulate material in order to achieve a reasonably even mixture with uniform smoldering properties.

As noted above, the carbonaceous additive which is distributed through the particulate material may be a liquid (at the prevailing atmospheric temperature and pressure) or a solid material. Suitable carbonaceous liquids, typically with a total organic carbon concentration of 35 to 85 weight percent, may include alcohols, e.g., bioethanol, biobutanol or higher alcohols if sufficiently economically attractive, esters such as fatty-acid methyl esters, conveniently available in large quantity as biodiesel, or other materials which are combustible under appropriate conditions and biodegradable in the environment, e.g., fatty acids or other fatty-acid derivatives. Fatty acids and fatty-acid derivatives may also be solid or semi-solid, e.g., waxy materials, depending on the prevailing conditions. Liquid materials may be introduced into a treatment bed as such or in the form of solutions or suspensions with the additive contained in a carrier, such as water. Depending on the mobility of the liquid into the bed, the liquid may be introduced through percolation over a period of time before smoldering is initiated. Alternatively, distribution may be achieved through one or more injectors extending into the ground. In the case of low-mobility additives, such as fatty-acid derivatives, high additive concentrations proximate to injection locations may be distributed through the treatment bed under the action of the smoldering front. This migration of the additive would occur ahead of an approaching smoldering front, as temperatures rise and water is converted to steam. The process is comparable to the one in which oils migrate during fireflooding.

A preferred class of smoldering-promoting additives includes peat, leonardite (an oxidized derivative of lignite), and humalite (a derivative of sub-bituminous coal). These materials are rich in humic substances (a mixture of humic acids, fulvic acids, and humin formed from decayed organic matter), typically have total organic carbon concentrations in the range of 30 to 50 weight percent, and are commonly used as soil conditioners, a practice which demonstrates environmental compatibility with soil. Additionally, residual amounts of these additives in treated soil or other particulate materials may improve properties such as organic content, nutrient retention, texture, ability to chelate metals, and microbial activity. From this class of additives, humalite is particularly attractive because it tends to be denser than peat and possess lower sulfur, metals, and ash content than leonardite. Beyond this class, other suitable solid smoldering-promoting additives include lignite, biochar, biosolids, compost, corn stalks, chaff, chopped straw, rice hulls, shredded wood or bark, wood chips, chopped bagasse, and other agricultural and forestry wastes, depending on their local availability and economics.

For ex situ smoldering applications, solid or liquid additives can readily be mixed or dispersed into particulate materials as a pre-treatment step or as part of other pre-treatment steps, such as soil shredding. Additives may also be mixed or dispersed into particulate materials during transfer to a smoldering treatment chamber, for example, by a separate feeder for solids or a spray nozzle for liquids. For in situ smoldering, liquid additives may be injected or otherwise dispersed into the ground and solid additives may be incorporated into the ground through boreholes, trenches, or excavations.

The following scenarios illustrate some applications of the remediation procedure using solid and liquid smoldering-promoting additives.

Scenario 1: Large quantities of soil excavated from the site of a former petroleum refinery have been subject to bioremediation. A significant fraction of the bioremediated soil still exceeds regulatory limits for heavy hydrocarbons (hexadecane and heavier). Transfer of this soil to a waste facility would be costly and possibly impractical depending on the quantity involved. A continuous ex situ smoldering unit can be brought on-site to treat the soil at a cost well below offsite disposal at a waste facility, however, the fuel content of the soil is variable and sometimes below the self-sustaining threshold for smoldering. As the soil is fed into the smoldering reactor of the unit, the feed stream is mixed with fine biochar to achieve a concentration of 2 dry weight percent biochar. The entire mass of contaminated soil can now be treated in a reliable and economical process, with residual biochar functioning as a soil amendment to improve treated soil quality.

Scenario 2: The soil at a former production site in the far North has a broad spectrum of hydrocarbon contamination due to past exposure to crude oil. The remote location and cold climate at the site eliminate offsite disposal at a waste facility and bioremediation, respectively, as economic site remediation options. The soil is found to have sufficient fuel to sustain smoldering combustion, but its clayey texture necessitates shredding to improve air distribution before smoldering can be applied. A batch ex situ smoldering unit at the site effectively decontaminates the soil, but efficiency is lagging and costs are elevated due to frequent saturation and changing of the carbon adsorption bed used to filter harmful emissions. To address these issues, peat is added to the soil fed through the shredder to achieve a post-shredding concentration of 4 weight percent peat. Smoldering temperatures are consequently increased by 200° C., significantly reducing incomplete combustion of contaminants and saturation of the carbon adsorption bed.

Scenario 3: An in situ project to remediate soil with fuel-oil contamination uses soil flushing with a surfactant at an array of injection points. Soil core samples taken after treatment show that residual heavy hydrocarbons are moderately above regulatory standards at many locations and distributed in a discontinuous pattern. To allow treatment of the heavy hydrocarbons without site excavation, biodiesel is injected below ground using the system in place for soil flushing. The biodiesel enables in situ smoldering to be applied to remediate the site by elevating fuel concentrations to self-sustaining levels and providing a path for the smoldering front between disconnected contaminant volumes. Non-combusted biodiesel remaining in the ground after treatment rapidly biodegrades over the next two months.

Scenario 4: Mechanically-dredged hydrocarbon-contaminated sediment from an industrial waterway has a moisture content of 60 weight percent. The sediment is dewatered using a plate-and-frame filter press to 35 weight percent water. Due to high transport costs and tipping fees, disposal of the dewatered sediment at a waste facility is cost prohibitive, so a continuous ex situ smoldering system is set up on-site to treat the hydrocarbon contaminants. Due to the high moisture content, the dewatered sediment has insufficient fuel to enable self-sustaining smoldering combustion. The deficit in fuel is balanced by the addition of humalite to the sediment during feeding of the sediment into the smoldering chamber. As a result, on-site treatment and beneficial reuse of the sediment is possible.

EXAMPLES

The benchtop experiments described below which demonstrate the application of the smoldering process were carried out by placing approximately 3 kg of soil in a 14 cm (5.5 inch) diameter fused-quartz column. The bottom layer of soil is heated to 300° C. and air is then introduced through a sparger at the bottom of the column to ignite a smoldering combustion front. Next, the heater is switched off and the smoldering front is allowed to propagate upward in the column, fed by air and the fuel available in the soil. Thermocouples at different heights within the soil bed measure temperatures and soil samples taken before and after smoldering are analyzed to determine the effectiveness of contaminant removal. Examples 3 to 6 incorporate findings from benchtop experiments conducted in the above system to demonstrate the applicability of the continuous ex situ process to difficult remediation projects.

Example 1

Biodiesel ("BDSL") was added to soils at concentrations between 0 and 2 weight percent and the prepared soils were subject to benchtop smoldering tests as described above. The temperature profiles (FIG. 2) show how the addition of biodiesel to the soil causes a transition from an unsustainable process (smoldering front cools as it moves up the soil column) to a self-sustaining one at 1.5 weight percent biodiesel (smoldering front temperatures stabilize above 600° C.). The soil analysis (FIG. 3) demonstrates that adding sufficient biodiesel to the soil to achieve a self-sustaining process allows for effective removal of soil hydrocarbons in the range of C16-C34, which includes the added biodiesel.

Example 2

Humalite ("Hum"), a material rich in humic acids, was mixed into soils at concentrations between 0 and 3 dry weight percent. The prepared soils then underwent benchtop smoldering tests as described above, which demonstrated that the addition of 1.5 dry weight percent humalite was sufficient to establish self-sustaining smoldering (temperatures stabilize near 600° C. as the front moves up the soil column). In addition, increasing the concentration of humalite to 3 dry weight percent increased the stable front temperature to about 700° C., which would enhance contaminant oxidation and reduce harmful emissions. The results are shown graphically in FIG. 4.

Example 3

As demonstrated by fireflooding, a smoldering front not only destroys hydrocarbons, but mobilizes them. A benchtop smoldering experiment with an oil-contaminated soil sample showed that some oil migrates ahead of the smoldering combustion front (into a layer of ceramic beads in the experiment). This migration may complicate an in situ application, as contaminants can accumulate at the periphery of the treatment area. Such contaminant "halos" could even require subsequent ex situ treatment or disposal. In the continuous ex situ system, outward migration of organic contaminants is limited by the walls of the chamber, which can be insulated to maximize combustion, and volatile contaminants can be captured by the air emissions control system. Since non-volatile contaminants cannot effectively escape the hot zone, a larger proportion may be destroyed.

Example 4

A clayey soil sample from a site required shredding to achieve adequate air distribution through clayey agglomerates. When tested in the benchtop unit, smoldering was established in the shredded clayey soil with a smoldering combustion front advancing with a temperature of 850° C. at a height of 1 cm in the soil column 10 minutes after ignition. The front progressed up the column and reached a height of 11 cm 60 minutes after ignition, with a temperature at that level of 800° C. While such processing is not possible in situ, it can be coupled with an ex situ system. As shown in FIG. 1, the unit includes a shredder for reducing the size of feed agglomerates to improve packing and air distribution. Alternatively, such processing could occur in advance without system integration.

Example 5

Figure 5:
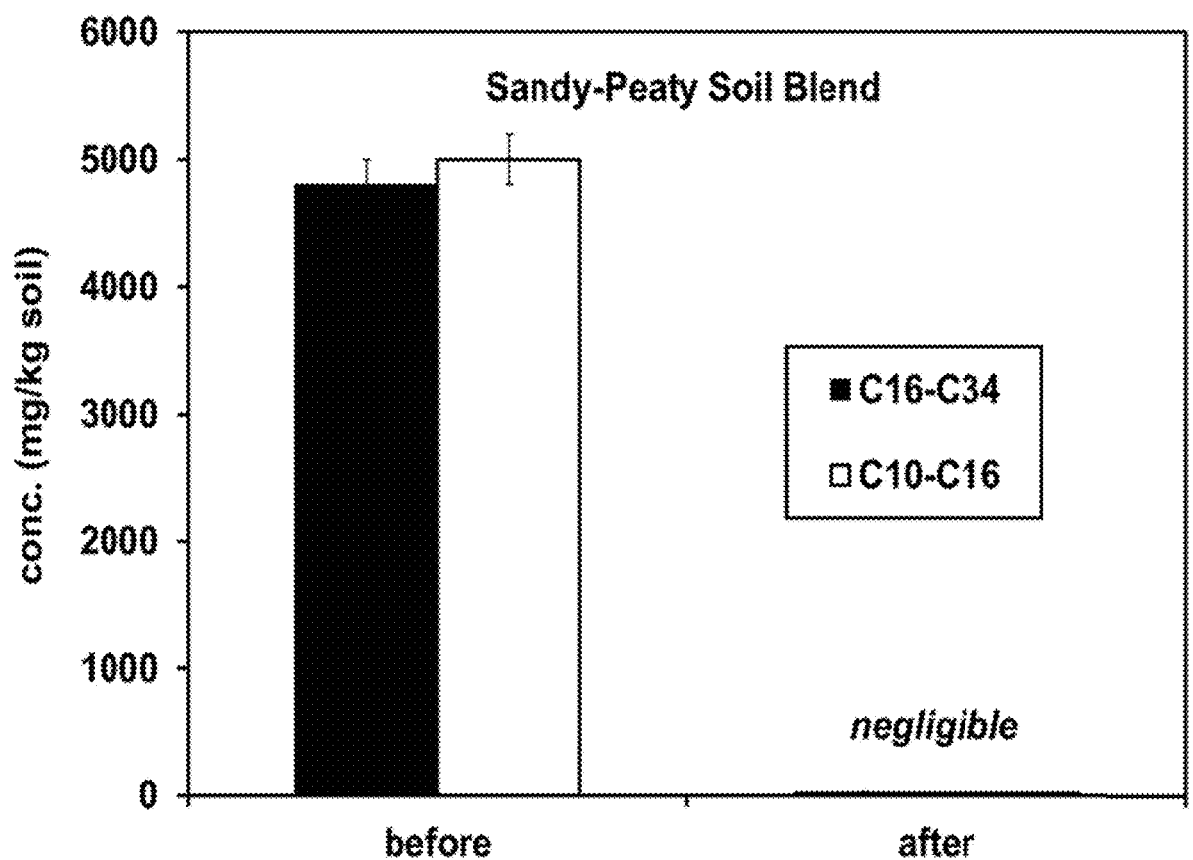
FIG. 5 is a graphical representation of the hydrocarbon contaminant concentrations in a mixture of two soils before and after smoldering.

Samples of two contrasting soils from a site in need of remediation were tested in the laboratory as described above. One of the soils was sandy and lacked sufficient fuel for sustaining smoldering combustion, while the other was peaty and combusted too vigorously due to its high concentration of natural organic matter. Neither soil was suitable for in situ remediation by smoldering, but the benchtop experiments demonstrated that mixtures of the two soils smoldered in a sustained and controlled manner, permitting effective contaminant destruction (FIG. 5). In field applications, mixing may be achieved by adding another feed inlet to the continuous ex situ system or in a separate preprocessing step. The ability to intermix soils before or within the continuous ex situ system may be useful for complex sites with multiple soil types, such as former oil refineries.

Example 6

Figure 2:
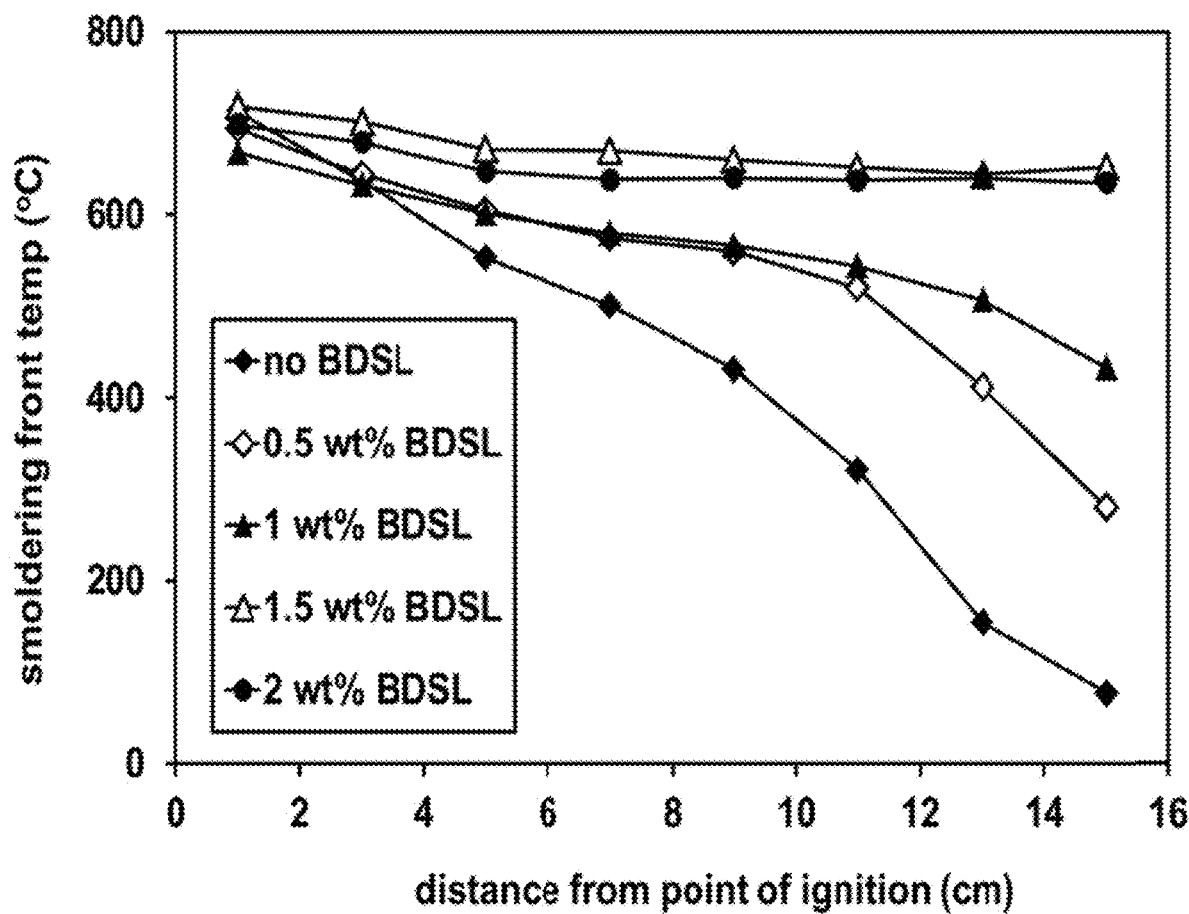
FIG. 2 is a graphical representation of the temperature profiles from smoldering tests on soils prepared with different concentrations of biodiesel.
Figure 3:
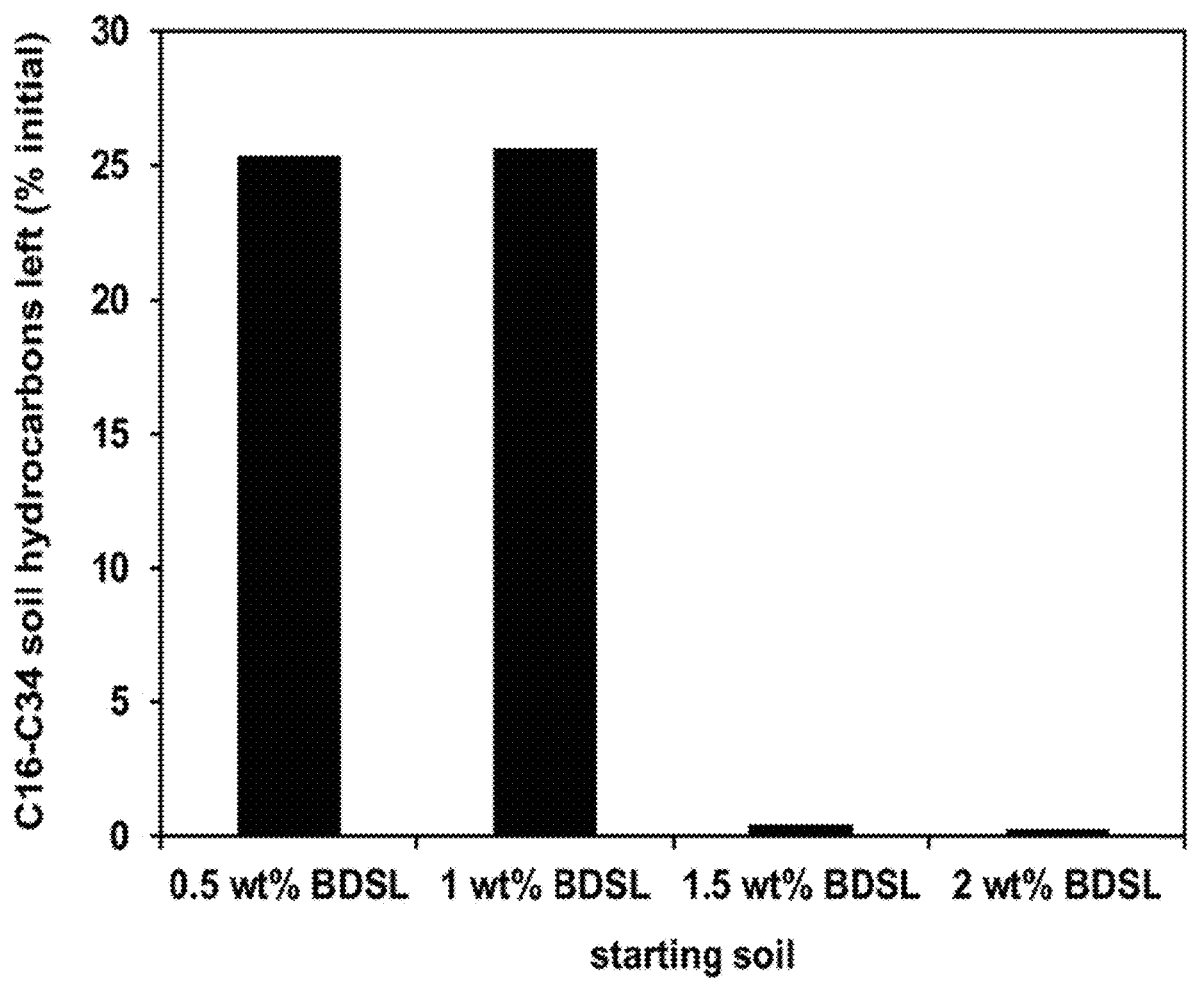
FIG. 3 is a graphical representation of the residual heavy hydrocarbon (C16-C34) concentrations in soils smoldered with different concentrations of biodiesel.
Figure 4:
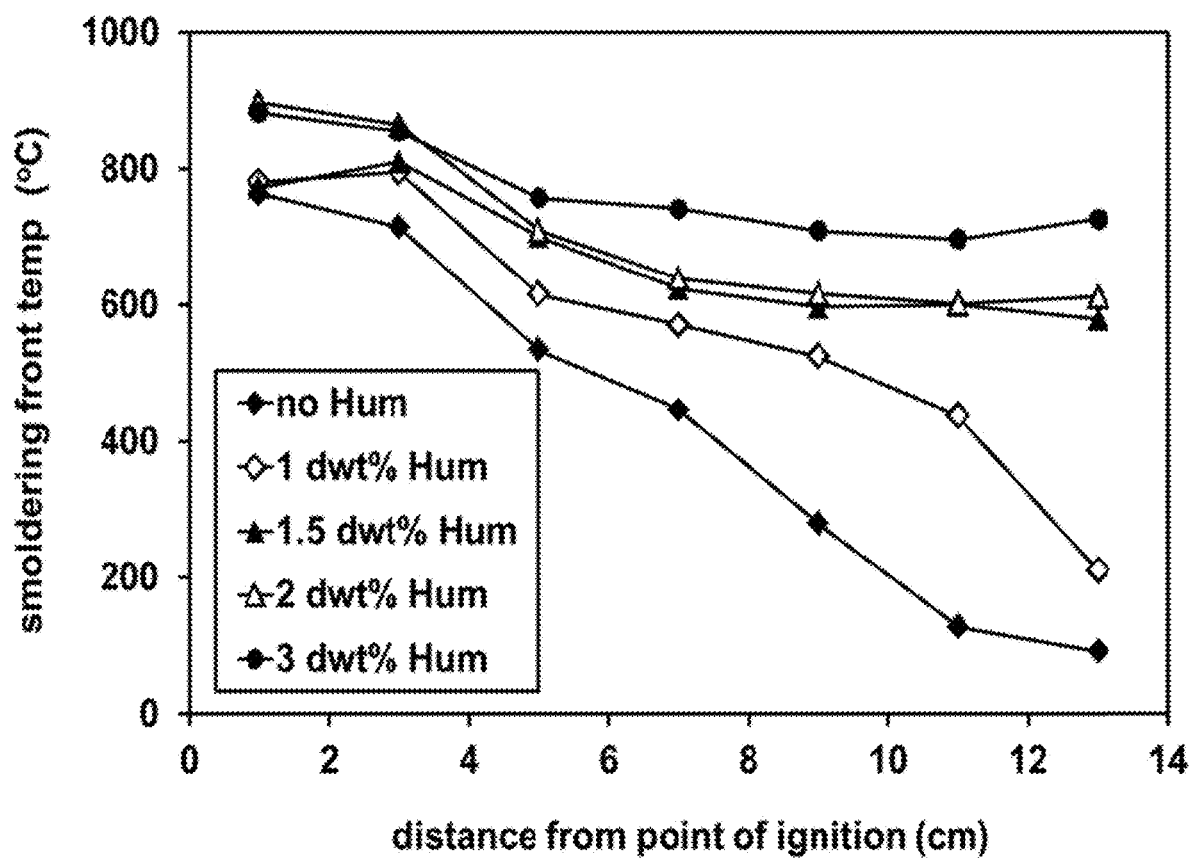
FIG. 4 is a graphical representation of the temperature profiles observed during benchtop smoldering tests on soils prepared with different concentrations of humalite.

Some soils have contaminant levels that are too low to sustain smoldering combustion. If remediation is required, the preferred method would be bioremediation, but it may be ineffective if the contaminants are resistant, e.g., refractory hydrocarbons. In such cases, smoldering can be applied by adding an environmentally benign source of fuel such as biodiesel or humalite. In FIGS. 2 and 4, the lowest trace shows that smoldering is not maintained beyond a short distance from the point of ignition without the benefit of a smoldering-promoting additive. The addition of 2% biodiesel or 2% humalite, however, enables a stable smoldering front to pass through the soils with temperatures above 600° C. As in earlier examples, this approach is not compatible with prior in situ methods. However, using the continuous ex situ system, a solid fuel can be mixed in similarly to a second soil (Example 5), while a liquid fuel can be dispersed with a spray nozzle at the top of the smoldering chamber.

Without a strategy for increasing the fuel content of such soils, remediation by smoldering would not be viable since the smoldering front fails to sustain itself. In addition, strategies that rely on contaminant-type fuel sources (e.g., oily waste or petroleum hydrocarbons) effectively exacerbate the level of pollution before attempting to remediate, which carries with it a risk of incomplete removal of the contaminant fuel source and potentially hazardous emissions generation. Therefore, smoldering-promoting additives may prove beneficial for particulate materials with low levels of contaminants that are resistant to bioremediation.

Example 7

A site formerly subject to extensive petroleum industry operations has hundreds of kilotonnes of soil requiring remediation. The site is also on the edge of a forest with soil rich in peat, a smoldering promoter, which poses a substantial risk if an in situ smoldering remediation were to spread beyond the area of intended confinement. This risk is mitigated by the use of the continuous ex situ smoldering unit, as smoldering soil is isolated from the surroundings.

Example 8

Oily sludge from a refinery was found to have excessive combustible content (approximately 40 weight percent total organic carbon) for a controlled smoldering process. To apply smoldering to treat the sludge, dilution in a less combustible particulate material (e.g., sand or smoldered soil) would be required. Treatment of this sludge by smoldering would not be possible in an in situ format. However, the sludge is amenable to treatment in the continuous ex situ system, in which blending with a less combustible particulate material could occur prior to or during admission to the smoldering chamber. In addition, while blending with a less combustible particulate material decreases treatment throughput for the sludge, the continuous ex situ system better compensates for this drop in throughput by eliminating the loading-heating-smoldering-cooling-emptying cycles associated with batch operation.

The invention claimed is:
1. A process for the remediation of contaminated particulate materials comprising:

(i) removing the contaminated particulate material from its location in the ground,
(ii) transferring the contaminated particulate material removed from the ground and loading it into a remediation unit comprising a vertically extensive smoldering combustion vessel having an inlet at the top for contaminated feed and an outlet at the bottom for remediated product to be withdrawn from the vessel,
(iii) heating a region of loaded feed in the vessel,
(iv) admitting combustion-supporting gas into the loaded feed to ignite a smoldering combustion front and enable the front to progress through the loaded feed in the vessel,
(v) withdrawing smoldered product from the bottom of the vessel and loading additional contaminated feed at the top of the vessel to maintain the smoldering combustion front at a vertical location in the vessel between the top and the bottom of the vessel.

2. A process according to claim 1, wherein the contaminated feed is continuously admitted at the top of the vessel and smoldered product is continuously withdrawn through the outlet at the bottom of the vessel.

3. A process according to claim 2, wherein the smoldering combustion front in the vessel is maintained at a substantially fixed vertical location in the vessel between the top and the bottom of the vessel.

4. A process according to claim 1, wherein the contaminated feed is intermittently admitted at the top of the vessel and smoldered product is intermittently withdrawn through the outlet at the bottom of the vessel to maintain the smoldering combustion front at a vertical location in the vessel between the top and the bottom of the vessel.

5. A process according to claim 1, wherein the combustion-supporting gas comprises air.

6. A process according to claim 1, wherein the combustion-supporting gas comprises a mixture of air and nitrogen.

7. A process according to claim 1, wherein the smoldering is initiated in the loaded feed in the vessel by heating a region of loaded feed by means of electric heaters.

8. A process according to claim 7, wherein the heaters are withdrawn from the loaded feed after the smoldering is initiated.

9. A process according to claim 1, further comprising one of collecting and filtering or collecting and burning exhaust gases from the smoldering loaded feed.

10. A process according to claim 1, wherein the contaminated particulate material is admixed with a smoldering-promoting additive prior to or during loading to the vessel in order to facilitate smoldering combustion.

11. A process according to claim 10, wherein an admixed smoldering-promoting additive has at least 25 weight percent total organic carbon and is added to the contaminated particulate material in an average concentration of up to 10 weight percent post-addition.

12. A process according to claim 1, wherein the contaminated particulate material is admixed with a complementary particulate material prior to or during loading to the vessel in order to facilitate smoldering combustion.

13. A process according to claim 12, wherein the complementary particulate material modifies aggregate fuel concentration or aggregate texture.

14. A process according to claim 13, wherein the complementary particulate material is a less combustible diluent.

15. A process according to claim 14, wherein the diluent is a previously smoldered particulate material.

16. A process according to claim 1, wherein the loaded feed in the vessel attains a temperature at the smoldering front of at least 600° C.

* * * * *